US010663061B2

(12) United States Patent
Hattori et al.

(10) Patent No.: US 10,663,061 B2
(45) Date of Patent: May 26, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventors: Kunio Hattori, Nagoya (JP); Akihide Ito, Nagoya (JP); Takuro Shimazu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/291,305

(22) Filed: Mar. 4, 2019

(65) Prior Publication Data
US 2019/0271393 A1   Sep. 5, 2019

(30) Foreign Application Priority Data

Mar. 5, 2018  (JP) .................................. 2018-039151

(51) Int. Cl.
*F16H 61/662*   (2006.01)
(52) U.S. Cl.
CPC . *F16H 61/66259* (2013.01); *F16H 61/66227* (2013.01); *F16H 61/66272* (2013.01)
(58) Field of Classification Search
CPC ............. F16H 61/662; F16H 61/66259; F16H 61/66227; B60W 10/02; B60W 10/06; B60W 10/107
See application file for complete search history.

(56) References Cited

U.S. PATENT DOCUMENTS

| 2003/0149520 | A1* | 8/2003 | Taniguchi ......... F16H 61/66259 |
| | | | 701/59 |
| 2003/0195688 | A1 | 10/2003 | Mensler et al. |
| 2010/0062884 | A1* | 3/2010 | Tay .......................... F16H 9/08 |
| | | | 474/25 |
| 2013/0218429 | A1 | 8/2013 | Ayabe et al. |
| 2014/0162815 | A1* | 6/2014 | Natori ............... F16H 61/66259 |
| | | | 474/11 |

FOREIGN PATENT DOCUMENTS

| JP | 2004-068936 A | 3/2004 |
| JP | 2006-017182 A | 1/2006 |
| JP | 2013-096450 A | 5/2013 |
| WO | 2012/017536 A1 | 2/2012 |

* cited by examiner

*Primary Examiner* — Edwin A Young
(74) *Attorney, Agent, or Firm* — Oliff PLC

(57) ABSTRACT

A control apparatus for a vehicle drive-force transmitting apparatus including a continuously-variable transmission mechanism whose gear ratio is calculated based on a detected value of an input rotational speed of the transmission mechanism and a processed output-rotational-speed value that is a detected value of an output rotational speed of the transmission mechanism subjected to a filter processing. Updating the gear ratio of the transmission mechanism is inhibited (i) when the processed output-rotational-speed value is in a low rotational speed range with an absolute value of a rate of change of the processed output-rotational-speed value being not smaller than a given value, and also (ii) when the processed output-rotational-speed value is in the low rotational speed range with the absolute value of the rate of change of the processed output-rotational-speed value being smaller than the given value, if a certain operation that increases the absolute value is being executed.

9 Claims, 6 Drawing Sheets

CONTROL APPARATUS FOR VEHICLE DRIVE-FORCE TRANSMITTING APPARATUS

This application claims priority from Japanese Patent Application No. 2018-039151 filed on Mar. 5, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus includes a continuously-variable transmission mechanism provided in a drive-force transmitting path between a drive force source and drive wheels of the vehicle.

BACKGROUND OF THE INVENTION

There is known a control apparatus for a drive-force transmitting apparatus that is to be provided in a vehicle having a drive force source and drive wheels, wherein the drive-force transmitting apparatus is configured to transmit a drive force of the drive force source toward the drive wheels and which includes a continuously-variable transmission mechanism including a primary pulley, a secondary pulley and a transfer element looped over the primary and secondary pulleys. WO2012/017536 discloses such a control apparatus for a drive-force transmitting apparatus including a continuously-variable transmission mechanism. In the disclosed control apparatus, when each of detected values of input and output rotational speeds of the continuously-variable transmission mechanism, which are used in calculation of an actual gear ratio of the continuously-variable transmission mechanism, is in a rotational speed region that is lower than a predetermined extremely low value, it is determined that the detected value does not reflect an actual value of the rotational speed.

SUMMARY OF THE INVENTION

By the way, there is an arrangement in which a filter processing is executed to delay change of a detected value of the output rotational speed of the continuously-variable transmission mechanism, for removing disturbance factors, for example, during running of the vehicle on a poor-conditioned road. On the other hand, there is an arrangement in which a continuously-variable-transmission engagement device is provided in a drive-force transmitting path section between the continuously-variable transmission mechanism and the drive wheels in the drive-force transmitting apparatus. In this arrangement, the continuously-variable transmission mechanism is selectively connected to and separated from the drive wheels, by switching the continuously-variable-transmission engagement device between an engaged state and a released state, so that the output rotational speed of the continuously-variable transmission mechanism is likely to be changed. For example, there is a case in which the output rotational speed of the continuously-variable transmission mechanism is reduced to a rotational speed range that is lower than an extremely low value. In this case, if the detected value of the output rotational speed is subjected to the above-described filter processing, the thus processed output-rotational-speed value is not immediately reduced to be lower than the extremely low value and is likely to be delayed to reflect an actual value of the output rotational speed. Thus, a determination that the detected value of the output rotational speed does not reflect the actual value of the output rotational speed is delayed, whereby there is a risk that the actual gear ratio of the continuously-variable transmission mechanism could be erroneously calculated.

The present invention was made in view of the background art described above. It is therefore an object of the present invention to provide a control apparatus for a vehicle drive-force transmitting apparatus, which is capable of preventing a calculation of an actual gear ratio of the continuously-variable transmission mechanism from being erroneously made where a processed output-rotational-speed value is used in the calculation of the actual gear ratio.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus is configured to transmit a drive force of the drive force source toward the drive wheels, and includes (a) a continuously-variable transmission mechanism including a primary pulley, a secondary pulley and a transfer element looped over the primary and secondary pulleys, and (b) an engagement device disposed between the continuously-variable transmission mechanism and the drive wheels in a drive-force transmitting path section. The control apparatus comprises: a filter processing portion configured to make a filter processing on a detected value of an output rotational speed of the continuously-variable transmission mechanism so as to slow or delay change of the detected value, and configured to output, as a processed output-rotational-speed value, the detected value of the output rotational speed on which the filter processing has been made; a transmission shifting control portion configured to calculate a gear ratio of the continuously-variable transmission mechanism, based on the processed output-rotational-speed value and a detected value of an input rotational speed of the continuously-variable transmission mechanism; and an update inhibiting portion configured to inhibit the transmission shifting control portion from updating the gear ratio of the continuously-variable transmission mechanism, when the processed output-rotational-speed value is in a low rotational speed range that is lower than a high rotational speed range with an absolute value of a rate of change of the processed output-rotational-speed value being not smaller than a given value. The update inhibiting portion is configured, also when the processed output-rotational-speed value is in the low rotational speed range with the absolute value of the rate of change of the processed output-rotational-speed value being smaller than the given value, to inhibit the transmission shifting control portion from updating the gear ratio of the continuously-variable transmission mechanism, if a certain operation that increases the absolute value is being executed.

According to a second aspect of the invention, in the control apparatus according to the first aspect of the invention, a lower limit of the low rotational speed range is a first output-rotational-speed value, and an upper limit of the low rotational speed range is lower than a second output-rotational-speed value that is a lower limit of the high rotational speed range, wherein the update inhibiting portion is configured, when the detected value of the input rotational speed is not lower than a lower limit value with the processed output-rotational-speed value being not lower than the first output-rotational-speed value and being lower than the second output-rotational-speed value, to inhibit the transmission shifting control portion from updating the gear ratio of the continuously-variable transmission mechanism, if the certain operation is being executed.

According to a third aspect of the invention, in the control apparatus according to the second aspect of the invention, the update inhibiting portion is configured, when the detected value of the input rotational speed is lower than the lower limit value with the processed output-rotational-speed value being lower than the first output-rotational-speed value, to inhibit the transmission shifting control portion from updating the gear ratio of the continuously-variable transmission mechanism, wherein the update inhibiting portion is configured, also when the detected value of the input rotational speed is not lower than the lower limit value with the processed output-rotational-speed value being not lower than the first output-rotational-speed value and being lower than the second output-rotational-speed value and with the absolute value of the rate of change of the processed output-rotational-speed value being not smaller than the given value, to inhibit the transmission shifting control portion from updating the gear ratio of the continuously-variable transmission mechanism.

According to a fourth aspect of the invention, in the control apparatus according to the second or third aspect of the invention, the update inhibiting portion is configured, when the detected value of the input rotational speed is not lower than the lower limit value with the processed output-rotational-speed value being not lower than the second output-rotational-speed value, to allow the transmission shifting control portion to update the gear ratio of the continuously-variable transmission mechanism, wherein the update inhibiting portion is configured, also when the detected value of the input rotational speed is not lower than the lower limit value with the processed output-rotational-speed value being not lower than the first output-rotational-speed value and being lower than the second output-rotational-speed value and with the absolute value of the rate of change of the processed output-rotational-speed value being smaller than the given value, to allow the transmission shifting control portion to update the gear ratio of the continuously-variable transmission mechanism, if the certain operation is not being executed.

According to a fifth aspect of the invention, in the control apparatus according to any one of the first through fourth aspects of the invention, the certain operation is a control operation that is to be executed, when the engagement device is in a released state, to switch the engagement device from the released state to an engaged state, in response to a shifting operation made by an operator of the vehicle to place a shifting device into a running operation position.

According to a sixth aspect of the invention, in the control apparatus according to any one of the first through fourth aspects of the invention, the drive force source is an engine, wherein the certain operation is a control operation that is to be executed, during running of the vehicle with the engagement device being in an engaged state, to stop an operation of the engine and to switch the engagement device from the engaged state to a released state.

According to a seventh aspect of the invention, in the control apparatus according to any one of the first through fourth aspects of the invention, the drive-force transmitting apparatus further includes: an input rotary member to which the drive force is to be transmitted from the drive force source; an output rotary member from which the drive force is to be outputted to the drive wheels; a gear mechanism configured to provide at least one gear ratio; and a first engagement device that is provided in addition to the engagement device as a second engagement device, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path, such that the drive force is transmitted by the gear mechanism through the first drive-force transmitting path when the first drive-force transmitting path is established by engagement of the first engagement device, and wherein the plurality of drive-force transmitting paths include a second drive-force transmitting path that includes a section corresponding to the drive-force transmitting path section, such that the drive force is transmitted by the continuously-variable transmission mechanism through the second drive-force transmitting path when the second drive-force transmitting path is established by engagement of the second engagement device.

According to an eighth aspect of the invention, in the control apparatus according to the seventh aspect of the invention, the certain operation is a control operation that is to be executed, when each of the first and second engagement devices are in a released state, to switch only one of the first and second engagement devices from the released state to an engaged state, in response to a shifting operation made by an operator of the vehicle to place a shifting device into a running operation position.

According to an ninth aspect of the invention, in the control apparatus according to the seventh aspect of the invention, the drive force source is an engine, wherein the certain operation is a control operation that is to be executed, during running of the vehicle with only one of the first and second engagement devices being in an engaged state, to stop an operation of the engine and to switch the one of the first and second engagement devices from the engaged state to a released state.

In the control apparatus according to the first aspect of the invention, when the processed output-rotational-speed value is in the low rotational speed range (in which, for example, an accuracy of calculation of the gear ratio is assured as long as the absolute value of the rate of change of the processed output-rotational-speed value is smaller than the given value) and the certain operation (which, for example, is likely to cause the absolute value of the rate of change of the processed output-rotational-speed value to be not smaller than the given value) is being executed, the transmission shifting control portion is inhibited from updating the gear ratio of the continuously-variable transmission mechanism. Thus, even if the absolute value of the rate of change of the processed output-rotational-speed value becomes not smaller than the given value with delay relative to an absolute value of a rate of change of the actual output rotational speed upon execution of the certain operation, it is possible to prevent the gear ratio of the continuously-variable transmission mechanism from being updated in a period in which the increase of the absolute value of the rate of change of the processed output-rotational-speed value is delayed relative to the increase of the absolute value of a rate of change of the actual output rotational speed. Therefore, it is possible to prevent the calculation of the actual gear ratio of the continuously-variable transmission mechanism from being made erroneously where the processed output-rotational-speed value is used in the calculation of the actual gear ratio of the continuously-variable transmission mechanism.

In the control apparatus according to the second aspect of the invention, when the detected value of the input rotational speed is not lower than the above-described lower limit value with the processed output-rotational-speed value being not lower than the first output-rotational-speed value and being lower than the second output-rotational-speed value, the transmission shifting control portion is inhibited from updating the gear ratio of the continuously-variable transmission mechanism, if the certain operation is being executed. Thus, it is possible to assure the accuracy of detection of the rotational speeds used in calculation of the actual gear ratio and to prevent the actual gear ratio from being erroneously calculated.

In the control apparatus according to the third aspect of the invention, the transmission shifting control portion is inhibited from updating the gear ratio of the continuously-variable transmission mechanism, (i) when the detected value of the input rotational speed is lower than the lower limit value with the processed output-rotational-speed value being lower than the first output-rotational-speed value, and (ii) when the detected value of the input rotational speed is not lower than the lower limit value with the processed output-rotational-speed value being not lower than the first output-rotational-speed value and being lower than the second output-rotational-speed value and with the absolute value of the rate of change of the processed output-rotational-speed value being not smaller than the given value. Thus, the gear ratio of the continuously-variable transmission mechanism is not updated when the accuracy of detection of the input rotational speed is not assured and when the accuracy of the output-rotational-speed value is not assured. Further, when the absolute value of the rate of change of the processed output-rotational-speed value is so large that, for example, the accuracy of calculation of the gear ratio of the continuously-variable transmission mechanism, the gear ratio of the continuously-variable transmission mechanism is not updated, so that it is possible to avoid the actual gear ratio from being calculated erroneously due to change of the output rotational speed.

In the control apparatus according to the fourth aspect of the invention, the transmission shifting control portion is allowed to update the gear ratio of the continuously-variable transmission mechanism, (i) when the detected value of the input rotational speed is not lower than the lower limit value with the processed output-rotational-speed value being not lower than the second output-rotational-speed value, and (ii) when the detected value of the input rotational speed is not lower than the lower limit value with the processed output-rotational-speed value being not lower than the first output-rotational-speed value and being lower than the second output-rotational-speed value and with the absolute value of the rate of change of the processed output-rotational-speed value being smaller than the given value, as long as the certain operation is not being executed. Thus, it is possible to make the calculation of the actual gear ratio with the calculation accuracy being appropriately assured.

In the control apparatus according to the fifth aspect of the invention, it is possible to prevent the actual gear ratio from being calculated erroneously upon execution of the control operation as the certain operation that is executed, when the engagement device is in the released state, to switch the engagement device from the released state to the engaged state, in response to the shifting operation made by the vehicle operator to place the shifting device into the running operation position.

In the control apparatus according to the sixth aspect of the invention, it is possible to prevent the actual gear ratio of the continuously-variable transmission mechanism from being calculated erroneously upon execution of the control operation as the certain operation that is executed, during running of the vehicle with the engagement device being in an engaged state, to stop the operation of the engine and to switch the engagement device from the engaged state to the released state.

In the control apparatus according to the seventh aspect of the invention, it is possible to prevent the actual gear ratio of the continuously-variable transmission mechanism from being calculated erroneously where the processed output-rotational-speed value is used in the calculation of the actual gear ratio in the drive-force transmitting apparatus that defines the plurality of drive-force transmitting paths provided between the input and output rotary members and including the first drive-force transmitting path constituted principally by the gear mechanism and the second drive-force transmitting path constituted principally by the continuously-variable transmission mechanism.

In the control apparatus according to the eighth aspect of the invention, it is possible to prevent the actual gear ratio from being calculated erroneously upon execution of the control operation as the certain operation that is executed, when both of the first and second engagement devices are in released states, to switch only one of the first and second engagement devices from the released state to the engaged state, in response to the shifting operation made by the operator of the vehicle to place the shifting device into the running operation position.

In the control apparatus according to the ninth aspect of the invention, it is possible to prevent the actual gear ratio from being calculated erroneously upon execution of the control operation as the certain operation that is executed, during running of the vehicle with only one of the first and second engagement devices being in an engaged state, to stop an operation of the engine and to switch this one of the first and second engagement devices from the engaged state to the released state.

DETAILED DESCRIPTION OF PREFERRED EMBODIMENTS

Figure 1:
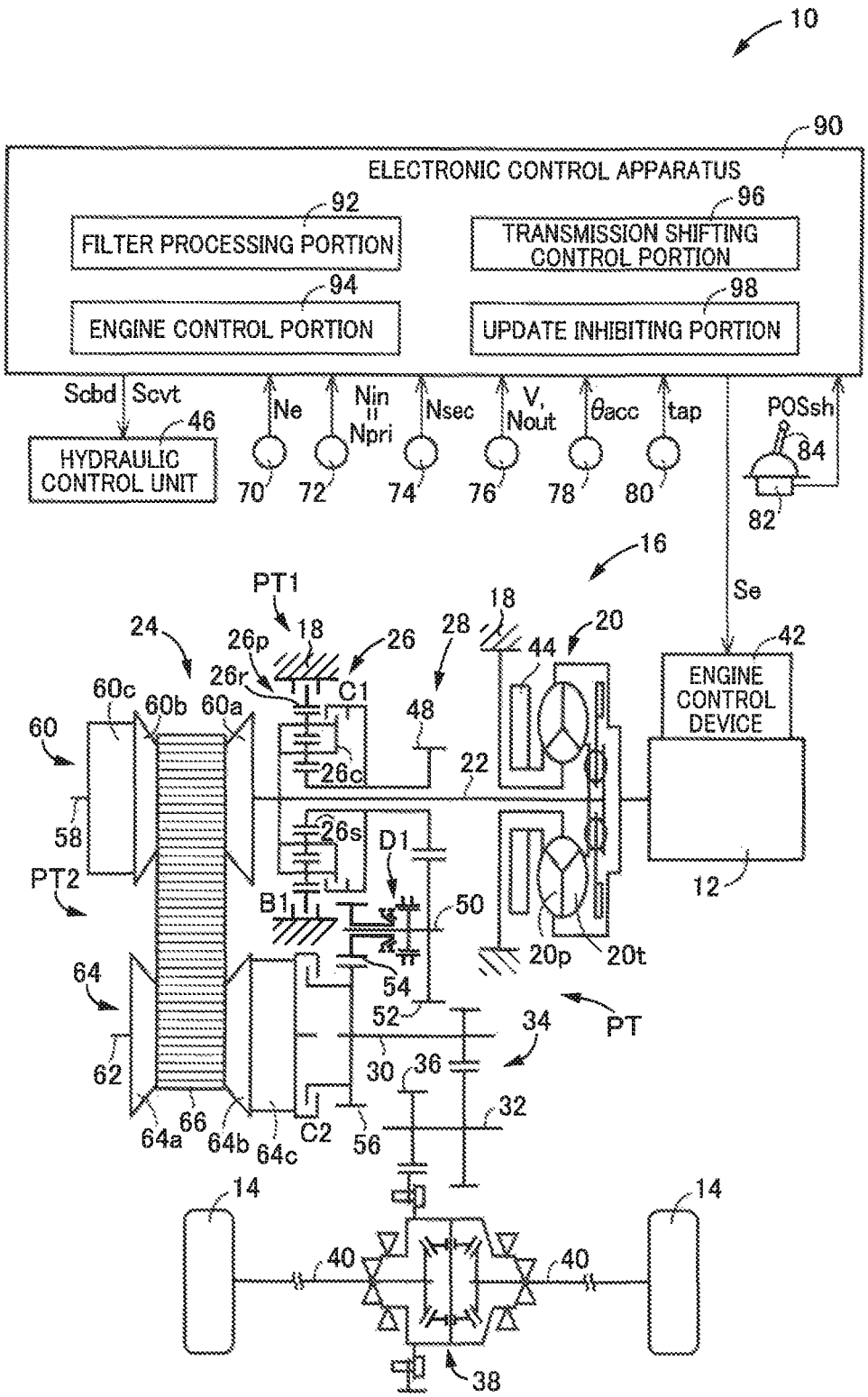
FIG. 1 is a schematic view showing a construction of a vehicle to be controlled by a control apparatus according to the present invention, and major control functions and control portions of the control apparatus.

In the embodiments of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

It is noted that the term "gear ratio" is defined as "rotational speed of input-side rotary member/rotational speed of output-side rotary member". For example, the gear ratio of the above-described continuously-variable transmission mechanism is defines as "input rotational speed of the continuously-variable transmission mechanism/output rotational speed of the continuously-variable transmission mechanism", i.e., "rotational speed of the primary pulley/rotational speed of the secondary pulley". Further, the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. A highest gear ratio can be expressed also as a lowest-speed gear ratio.

The above-described drive force source is, for example, an internal combustion engine such as a gasoline engine and a diesel engine generating a drive force by combustion of fuel supplied thereto. The vehicle may be equipped with, in addition to a drive force source in the form of the engine, another drive force source in the form of, for example, an electric motor. Further, the vehicle may be equipped with an electric motor as the drive force source in place of the engine, where the above-described control operation is not executed to stop an operation of the engine and to switch the engagement device from the engaged state to the released state.

Hereinafter, preferred embodiments of the invention will be described in detail with reference to the accompanying drawings.

First Embodiment

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as another first engagement device, is provided in the first drive-force transmitting path PT1 and configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. The first clutch C1 as the first engagement device may be referred also to as a gear engagement device for a forward running of the vehicle 10.

The second clutch C2 as the second engagement device may be referred also to as a continuously-variable-transmission engagement device. The first brake B1 as the another first engagement device may be referred also to as a gear engagement device for a reverse running of the vehicle 10. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to "a control apparatus" recited in the appended claims), based on an operation amount $\theta acc$ of an accelerator pedal that corresponds to a required drive force of the vehicle 10 required by an operator of the vehicle 10, whereby an engine torque Te as an output of the engine 12 is controlled.

The torque converter 20 is provided with a pump impeller 20$p$ and a turbine impeller 20$t$ that are connected to the engine 12 and the input shaft 22, respectively. The drive-force transmitting apparatus 16 is provided with a mechanical oil pump 44 connected to the pump impeller 20$p$. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26$p$ of double-pinion type in addition to the first clutch C1 and the first brake B1. The planetary gear device 26$p$ is a differential mechanism including three rotary elements consisting of an input element in the form of a carrier 26$c$, an output element in the form of a sun gear 26$s$ and a reaction element in the form of a ring gear 26$r$. The carrier 26$c$ is connected to the input shaft 22. The ring gear 26$r$ is operatively connected to the casing 18 through the first brake B1. The sun gear 26$s$ is connected to a small-diameter gear 48 that is provided to be coaxial with the input shaft 22 and rotatable relative to the input shaft 22. The carrier 26$c$ and the sun gear 26$s$ are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
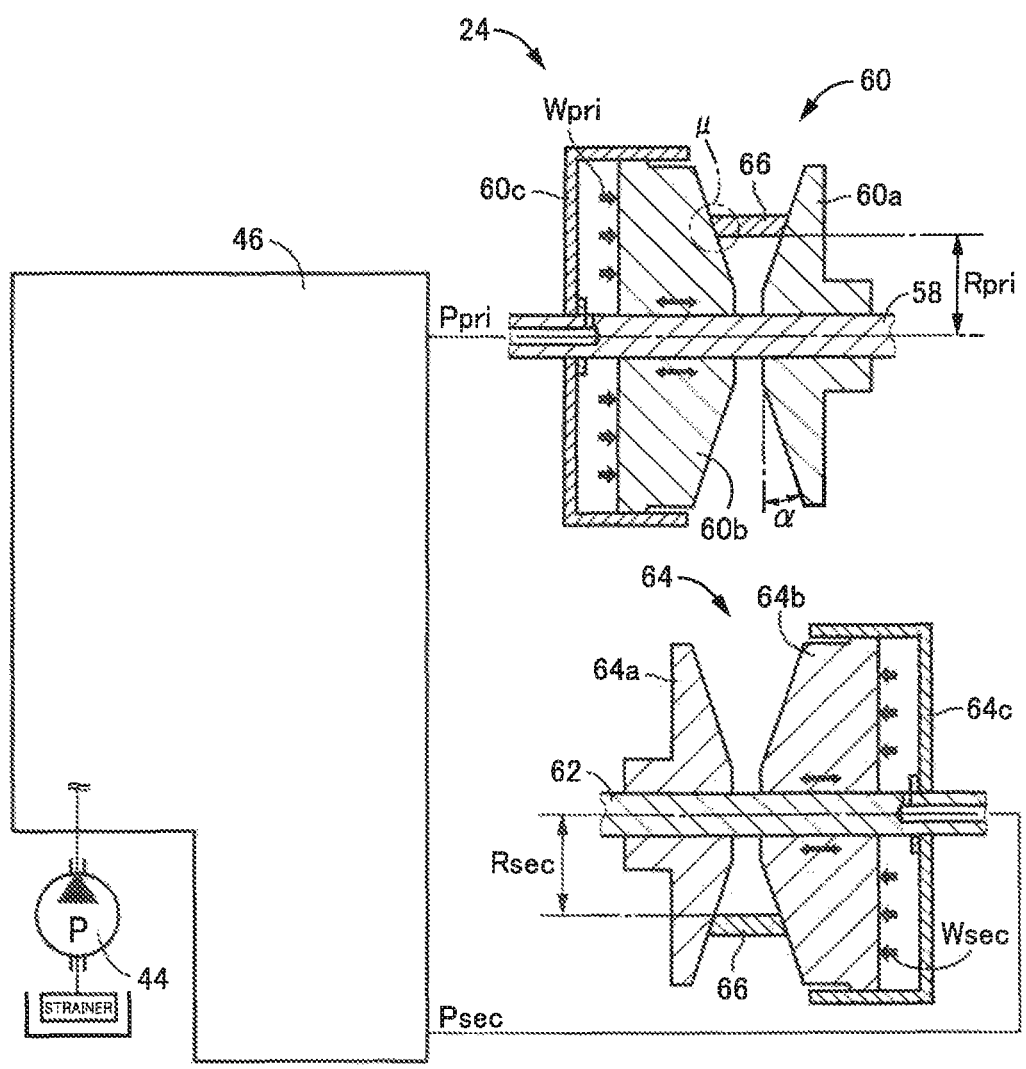
FIG. 2 is a view for explaining a construction of a continuously-variable transmission mechanism.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60*a* connected to the primary shaft 58, a movable sheave 60*b* unrotatable about an axis of the primary shaft 58 and axially movable relative to the fixed sheave 60*a*, and a hydraulic actuator 60*c* configured to apply a primary thrust Wpri to the movable sheave 60*b*. The primary thrust Wpri is a thrust (=primary pressure Ppri*pressure receiving area) for changing a width of a V-shaped groove defined between the fixed and movable sheaves 60*a*, 60*b* of the primary pulley 60. That is, the primary thrust Wpri is a thrust applied to the primary pulley 60 from the hydraulic actuator 60*c*, to clamp the transmission belt 66 that is mounted on the primary pulley 60. The primary pressure Ppri is a hydraulic pressure supplied from the hydraulic control unit 46 to the hydraulic actuator 60*c*, and serves as a pulley hydraulic pressure for generating the primary thrust Wpri. Meanwhile, the secondary pulley 64 includes a fixed sheave 64*a* connected to the secondary shaft 62, a movable sheave 64*b* unrotatable about an axis of the secondary shaft 62 and axially movable relative to the fixed sheave 64*a*, and a secondary hydraulic actuator 64*c* configured to apply a secondary thrust Wsec to the movable sheave 64*b*. The secondary thrust Wsec is a thrust (=secondary pressure Psec*pressure receiving area) for changing a width of a V-shaped groove defined between the fixed and movable sheaves 64*a*, 64*b* of the secondary pulley 64. That is, the secondary thrust Wsec is a thrust applied to the secondary pulley 64 from the secondary hydraulic actuator 64*c*, to clamp the transmission belt 66 that is mounted on the secondary pulley 64. The secondary pressure Psec is a hydraulic pressure supplied from the hydraulic control unit 46 to the secondary hydraulic actuator 64*c*, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 90, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvttgt is established by a combination of the primary thrust Wpri and the secondary thrust Wsec, rather than by only one of the primary thrust Wpri and the secondary thrust Wsec. The gear ratio γcvt of the continuously-variable transmission mechanism 24 is changed with change of a thrust ratio τ(=Wsec/Wpri) which is a ratio of the secondary thrust Wsec to the primary thrust Wpri and which is dependent on a relationship between the primary pressure Ppri and the secondary pressure Psec. For example, the gear ratio γcvt is increased with increase of the thrust ratio τ, namely, a shift-down action of the continuously-variable transmission mechanism 24 is caused with increase of the thrust ratio t.

The output shaft 30 is provided to be coaxial with the secondary shaft 62 and rotatable relative to the secondary shaft 62. The second clutch C2 is provided in a drive-force transmitting path section (that constitutes a part of the above-described second drive-force transmitting path PT2) between the secondary pulley 64 and the output shaft 30. Thus, the second clutch C2 is disposed in a later-stage side of the continuously-variable transmission mechanism 24, namely, in a drive-force transmitting path between the continuously-variable transmission mechanism 24 and the drive wheels 14. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 can run with the drive force being transmitted through the first drive-force transmitting path PT1 that is established in the drive-force transmitting apparatus 16. The belt running mode is a running mode in which the vehicle 10 can run with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator, an output signal of a throttle-opening degree sensor 80 indicative of the throttle opening degree tap; and an output signal of a shift position sensor 82 indicative of an operation position POSsh of a manually-operated shifting device in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the primary rotational speed Npri is a detected value of an input rotational speed of the continuously-variable transmission mechanism 24, and the secondary rotational speed Nsec is a detected value of an outside rotational speed of the continuously-variable transmission mechanism 24.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24. It is noted that each of the reverse position R and the drive position D corresponds to "a running operation position" recited in the appended claims. The running operation position may be defined as an operation position for placing the drive-force transmitting apparatus 16 in a drive-force transmittable state.

For performing various control operations in the vehicle 10, the electronic control apparatus 90 includes a filter processing means or portion in the form of a filter processing portion 92, an engine control means or portion in the form of an engine control portion 94 and a transmission shifting control means or portion in the form of a transmission shifting control portion 96.

The filter processing portion 92 makes a filter processing on the secondary rotational speed Nsec so as to slow or delay change of the secondary rotational speed Nsec, and outputs, as a processed output-rotational-speed value, the secondary rotational speed Nsec on which the filter processing has been made. The filter processing is a smooth processing that is made to smooth the change of the secondary rotational speed Nsec, namely, a smooth processing for the change of the secondary rotational speed Nsec. The smooth processing is, for example, a filter processing made by a lowpass filter to slow or delay the change of the secondary rotational speed Nsec. Since the secondary rotational speed Nsec is likely to be fluctuated or changed by disturbance applied from a road surface, the filter processing is made on the secondary rotational speed Nsec for removing disturbance factors, for example, during running of the vehicle 10 on a poor-conditioned road. In various control operations executed in the electronic control apparatus 90, the processed output-rotational-speed value outputted from the filter processing portion 92 is basically used as the value of the secondary rotational speed Nsec. In the following description regarding the present embodiment, the secondary rotational speed Nsec represents the processed output-rotational-speed value, unless otherwise specified.

The engine control portion 94 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 94 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 84 is the parking position P or the neutral position N during stop of the vehicle 10, the transmission shifting control portion 96 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 96 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 96 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 96 executes a switching control operation for switching the running mode between the gear running mode and the belt running mode. Specifically, the transmission shifting control portion 96 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 96 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 96 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 96 executes a stepped shifting control to release and engage the first and second clutches C1, C2, respectively, so as to cause the drive-force transmitting apparatus 16 to execute the shift-up action by which the selected running mode is switched from the gear running mode in which the first drive-force transmitting path PT1 is established to the belt running mode in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as a stepped shift-up action.

When determining that the running mode is to be switched from the belt running mode to the gear running mode so as to execute the shifting down from the second speed position to the first speed position during running in the belt running mode, the transmission shifting control portion 96 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 96 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as a stepped shift-down action.

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 96 supplies, to the hydraulic control unit 46, the hydraulic-control command signal Scvt for controlling the primary pressure Ppri and the secondary pressure Psec such that the target gear ratio γcvttgt is established in the continuously-variable transmission mechanism 24 while the belt slippage is not caused in the continuously-variable transmission mechanism 24.

Specifically, the transmission shifting control portion 96 calculates the target primary rotational speed Nprit by applying the accelerator operation amount θacc and the vehicle running speed V into a predetermined relationship in the form of a CVT shifting map. Then, the transmission shifting control portion 96 calculates the target gear ratio γcvttgt (=Nprit/Nsec) based on the target primary rotational speed Nprit. Further, the transmission-shifting control portion 96 calculates an estimated value of the engine torque Te, for example, by applying the throttle opening degree tap and the engine rotational speed Ne to a predetermined relationship such as an engine torque map. Then, the transmission-shifting control portion 96 calculates a turbine torque Tt, based on the estimated value of the engine torque Te and a predetermined relationship such as characteristic of the torque converter 20. The transmission-shifting control portion 96 handles or regards the turbine torque Tt as a primary input torque Tpri that is an input torque inputted to the primary pulley 60. The primary input torque Tpri is a torque that is to act on the primary shaft 58. The transmission shifting control portion 96 calculates a thrust ratio r for establishing a target gear ratio γcvtt, by applying the target gear ratio γcvtt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission shifting control portion 96 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission shifting control portion 96 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 96 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

In calculation of each of the target primary thrust Wprit and the target secondary thrust Wsect, a required thrust, which is minimally required to prevent the belt slippage in the continuously-variable transmission mechanism 24, is taken into consideration. This required thrust is a belt-slip limit thrust that is a thrust value shortly before occurrence of the belt slippage in the continuously-variable transmission mechanism 24.

The transmission shifting control portion 96 sets a primary limit thrust Wprilim that is the limit thrust for the primary pulley 60 and a secondary limit thrust Wseclim that is the limit thrust for the secondary pulley 64. The transmission shifting control portion 96 sets the primary limit thrust Wprilim by using equation (1) given below, and sets the secondary limit thrust Wseclim by using equation (2) given below. In the equations (1) and (2), "α" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt*Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24 (see FIG. 2). The transmission shifting control portion 96 calculates the gear ratio γcvt (=Npri/Nsec) of the continuously-variable transmission mechanism 24 by using the primary rotational speed Npri and the secondary rotational speed Nsec. It is noted that the sheave angle α is an angle defined between a conical surface of each of the pulleys 60, 64 and a plane perpendicular to an axis of a corresponding one of the pulleys 60, 64 (see FIG. 2).

$$Wprilim=(Tpr*\cos\alpha)/(2*\mu*Rpri) \qquad (1)$$

$$Wseclim=(\gamma cvt*Tpri*\cos\alpha)/(2*\mu*Rsec) \qquad (2)$$

The transmission shifting control portion 96 calculates a secondary shifting-control thrust Wsecsh (=τ*Wprilim) as a thrust that is required to be applied to the secondary pulley 64 for the shift control, based on the primary limit thrust Wprilim and the thrust ratio r that is required to establish the target gear ratio γcvtt. The transmission shifting control portion 96 sets, as a target secondary thrust Wsect, a larger one of the secondary limit thrust Wseclim and the secondary shifting-control thrust Wsecsh. The transmission shifting control portion 96 calculates the target primary thrust Wprit (=Wsect/τ), based on the target secondary thrust Wsect and the thrust ratio r that is required to establish the target gear ratio γcvtt.

The continuously-variable transmission mechanism 24 needs to be controlled to a certain state not only in a belt-running-mode situation in which the vehicle 10 is running in the belt running mode, but also in other situations other than the belt-running-mode situation. To this end, it is preferable to establish the target gear ratio γcvttgt of the continuously-variable transmission mechanism 24 while preventing a belt slippage in the continuously-variable transmission mechanism 24, not only in the belt-running-mode situation but also in the other situations. Thus, also in the other situations other than the belt-running-mode situation, as in the belt-running-mode situation, the transmission shifting control portion 96 calculates the target primary thrust Wprit and the target secondary thrust Wsect, and outputs the hydraulic control command signal Scvt for controlling the primary pressure Ppri and the secondary pressure Psec such that the target primary pressure Pprit and target secondary pressure Psect corresponding to the calculated target primary thrust Wprit and target secondary thrust Wsect are assured. The outputted hydraulic control command signal Scvt is supplied to the hydraulic control unit 46.

In the drive-force transmitting apparatus 16, the operation state of the second clutch C2 is to be switched among a plurality of states depending on, for example, the running mode of the vehicle 10, wherein the plurality of states include at least four states consisting of a fully released state, a fully engaged state, a releasing process state and an engaging process state. The second clutch C2 is placed in the fully engaged state during the belt running mode, and is placed in the fully released state during the gear running mode. Further, during the switching control operation executed for switching the running mode between the gear running mode and the belt running mode, the second clutch C2 is temporarily placed in the releasing process state or the engaging process state. Moreover, during a garage shifting operation that is executed by operation of the shift lever 84 between the neutral position N and the drive position D, too, the second clutch C2 is temporarily placed in the releasing process state or the engaging process state. The primary input torque Tpri, which is used in calculations of the target primary thrust Wprit and the target secondary thrust Wsect, is changed with change of the operation state of the second clutch C2.

The transmission shifting control portion 96 calculates the primary input torque Tpri depending on the operation state of the second clutch C2. For example, when the second clutch C2 is in the fully engaged state, namely, when the belt running mode is established, the primary input torque Tpri is set to the turbine torque Tt, as described above. When the second clutch C2 is in the engaging process state, the primary input torque Tpri is set to a converted value (=torque capacity of second clutch C2/actual gear ratio γcvt) of a torque capacity of the second clutch C2 converted on the primary shaft 58, wherein the torque capacity of the second clutch C2 is calculated, for example, based on contents of the hydraulic-control command signal Scbd. When the second clutch C2 is in the fully released state, the primary input torque Tpri is set to zero. When the second clutch C2 is in the releasing process state, the primary input torque Tpri is set to a value corresponding to a smaller one of the turbine torque Tt and the converted value of the torque capacity of the second clutch C2 converted on the primary shaft 58.

The transmission shifting control portion 96 determines which one of the four states (that consist of the fully released state, fully engaged state, releasing process state and engaging process state) is being established as the operation state of the second clutch C2, based on a state of the hydraulic control executed for the second clutch C2 and a rotational speed difference ΔNc2 (=Nsec−Nout) of the second clutch C2. The transmission shifting control portion 96 obtains the state of the hydraulic control executed for the second clutch C2, based on the contents of the hydraulic-control command signal Scbd. The state of the hydraulic control executed for the second clutch C2 represents whether the clutch pressure of the second clutch C2 tends to be increased or reduced and/or a command value of the clutch pressure of the second clutch C2 in the hydraulic control executed for the second clutch C2. The rotational speed difference ΔNc2 of the second clutch C2 represents an actual state of the second clutch C2, namely, how the second clutch C2 is actually being operated.

During stop of the vehicle 10 or running of the vehicle 10 at a low running speed, the actual gear ratio γcvt of the continuously-variable transmission mechanism 24 is set to a value equal to the highest gear ratio γmax or close to the highest gear ratio γmax, so that the secondary rotational speed Nsec is made lower than the primary rotational speed Npri when each of the primary and secondary pulleys 60, 64 of the continuously-variable transmission mechanism 24 is rotated. Where a well-known electromagnetic-pickup-type sensor is used as each of the primary and secondary speed sensors 72, 74 for detecting the respective primary and secondary rotational speeds Npri, Nsec, the detection of a lower one of the primary and secondary rotational speeds Npri, Nsec is delayed because an output of each pulse signal from a corresponding one of the primary and secondary speed sensors 72, 74, which detects the lower one of the primary and secondary rotational speeds Npri, Nsec, is delayed. Therefore, during stop of the vehicle 10 or running of the vehicle 10 at a low running speed, the detection of the secondary rotational speed Nsec is delayed relative to the detection of the primary rotational speed Npri, so that the gear ratio γcvt upon reduction of the rotational speeds is likely to be erroneously calculated to be too low, namely, calculated to be lower than the actual value.

When the secondary rotational speed Nsec is in a low rotational speed range with a rate of change of the secondary rotational speed Nsec is in a high range, the transmission shifting control portion 96 does not update the actual gear ratio γcvt. In other words, when the secondary rotational speed Nsec is in the low rotational speed range, the transmission shifting control portion 96 basically updates the actual gear ratio γcvt as long as the rate of change of the secondary rotational speed Nsec is not in the high range. However, the transmission shifting control portion 96 does not update the actual gear ratio γcvt when at least one of the primary rotational speed Npri and the secondary rotational speed Nsec is in an extremely low rotational speed range in which the detection accuracy as such is not assured due to characteristics of each of the primary and secondary speed sensors 72, 74. Thus, the accuracy of calculation of the actual gear ratio γcvt can be assured. In the following description regarding the present embodiment, the rate of change of the secondary rotational speed Nsec will be referred to as a secondary-rotational-speed change rate dNsec/dt.

Figure 3:
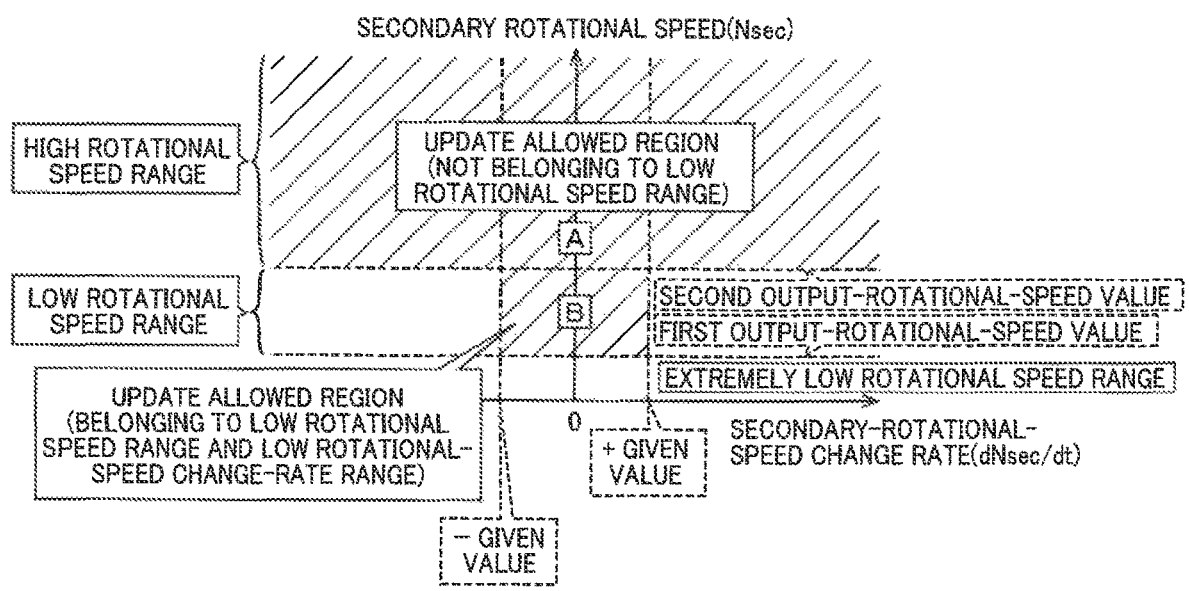
FIG. 3 is a view showing, by way of example, an update allowed region in which update of an actual gear ratio of the continuously-variable transmission mechanism is allowed.

FIG. 3 is a view showing, by way of example, an update allowed region in which update of the actual gear ratio γcvt of the continuously-variable transmission mechanism by the transmission shifting control portion 96 is allowed. In FIG. 3, the extremely low rotational speed range in which the secondary rotational speed Nsec is lower than a first output-rotational-speed value constitutes a part of an update inhibited region in which the update of the actual gear ratio γcvt by the transmission shifting control portion 96 is inhibited. The above-described extremely low rotational speed range is, for example, a predetermined rotational speed range in which the detection accuracy as such is likely to be poor due to characteristics of the secondary speed sensor 74. The above-described first output-rotational-speed value is, for example, a lower limit value of a predetermined output rotational speed range in which the detection accuracy of the secondary speed sensor 74 is assured. It is noted that the inhibition of update of the actual gear ratio γcvt may be made by inhibiting calculation of the actual gear ratio γcvt, or alternatively, may be made by stopping the actual gear ratio γcvt, which is used for various control operations, from being updated to a calculated value obtained by the calculation made in a repeated manner.

In FIG. 3, a hatched region A represents a region belonging to a high rotational speed range in which the secondary rotational speed Nsec is not lower than a second output-rotational-speed value. The hatched region A, i.e., the high rotational speed range constitutes a part of the updated allowed region. The high rotational speed range is, for example, a predetermined rotational speed range in which the calculation accuracy of the actual gear ratio γcvt is assured irrespective of the secondary-rotational-speed change rate dNsec/dt. The second output-rotational-speed value is a lower limit of the high rotational speed range.

Further, in FIG. 3, a hatched region B represents a region which belongs to the low rotational speed range in which the secondary rotational speed Nsec is not lower than the first output-rotational-speed value and being lower than the second output-rotational-speed value, and in which the absolute value of the secondary-rotational-speed change rate dNsec/dt is smaller than a given value. The hatched region B constitutes a part of the updated allowed region. The above-described given value is, for example, a lower limit of a range of the absolute value of the secondary-rotational-speed change rate dNsec/dt in which the calculation accuracy of the actual gear ratio γcvt is not assured when the secondary rotational speed Nsec is in the low rotational speed range. Thus, the low rotational speed range is a predetermined speed range which is lower than the high rotational speed range and in which the calculation accuracy of the actual gear ratio γcvt is assured when the absolute value of the secondary-rotational-speed change rate dNsec/dt is smaller than the above-described given value. In other words, a region, which belongs to the low rotational speed range and in which the absolute value of the secondaryrotational-speed change rate dNsec/dt is not smaller than the above-described value, constitutes a part of the update inhibited region.

The above-described part of the update allowed region, which is constituted by the hatched region A shown in FIG. 3, is a region which belongs to the high rotational speed range and does not belong to the above-described low rotational speed range and extremely low rotational speed range. The above-described other part of the update allowed region, which is constituted by the hatched region B shown in FIG. 3, is a region which belongs to the above-described low rotational speed range and in which the absolute value of the secondary-rotational-speed change rate dNsec/dt is small.

As described above, the update allowed region regarding the secondary rotational speed Nsec has been described with reference to FIG. 3. On the other hand, the update allowed region regarding the primary rotational speed Npri is determined, for example, by taking account of the detection accuracy of the primary speed sensor 72. Specifically, the update inhibited region in which update of the actual gear ratio γcvt by the transmission shifting control portion 96 is inhibited is constituted by an extremely low rotational speed range in which the primary rotational speed Npri is lower than a lower limit value. The extremely low rotational speed range is, for example, a predetermined rotational speed range in which the detection accuracy as such is likely to be poor due to characteristics of the primary speed sensor 72. The lower limit value is, for example, a lower limit value of a predetermined input rotational speed range in which the detection accuracy of the primary speed sensor 72 is assured.

By the way, there is a case in which the secondary rotational speed Nsec is reduced by execution of a certain control operation that corresponds to "a certain operation" that is recited in the appended claims. In such a case, the update of the actual gear ratio γcvt by the transmission shifting control portion 96 is inhibited when the secondary rotational speed Nsec is in the low rotational speed range with the absolute value of the secondary-rotational-speed change rate dNsec/dt being not smaller than the above-described given value (see FIG. 3). However, since the secondary rotational speed Nsec is subjected to the filter processing executed by the filter processing portion 92, the absolute value of the secondary-rotational-speed change rate dNsec/dt is increased to be not smaller than the given value with delay, so that a certain length of time could be required to inhibit the update of the actual gear ratio γcvt. Consequently, there is a risk that the actual gear ratio γcvt would be erroneously calculated to a shift-up side value, namely, the actual gear ratio γcvt would be calculated to be lower than the reality. Therefore, when the secondary rotational speed Nsec is in the low rotational speed range and a certain control operation is operated, it is desirable to inhibit the update of the actual gear ratio γcvt even if the absolute value of the secondary-rotational-speed change rate dNsec/dt is currently smaller than the above-described given value, wherein the certain control operation is an operation by execution of which the absolute value of the secondary-rotational-speed change rate dNsec/dt is increased, for example, probably, to the given value or more.

Specifically, the electronic control apparatus 90 further includes an update inhibiting means or portion in the form of an update inhibiting portion 98, for realizing function of inhibiting the update of the actual gear ratio γcvt, as described above.

The update inhibiting portion 98 inhibits the transmission shifting control portion 96 from updating the actual gear ratio γcvt of the continuously-variable transmission mechanism 24, when the secondary rotational speed Nsec is in the extremely low rotational speed range and when the secondary rotational speed Nsec is in the low rotational speed range and the above-described control operation is being executed.

More specifically, the update inhibiting portion 98 determines whether the primary rotational speed Npri is not lower than the above-described lower limit value. Further, the update inhibiting portion 98 determines whether the secondary rotational speed Nsec is not lower than the above-described first output-rotational-speed value, and determines whether the secondary rotational speed Nsec is lower than the above-described second output-rotational-speed value. Still further, the update inhibiting portion 98 determines whether the absolute value of the secondary-rotational-speed change rate dNsec/dt is not smaller than the above-described given value. Moreover, the update inhibiting portion 98 determines whether the above-described certain control operation is being executed.

When determining that (i) the primary rotational speed Npri is not lower the lower limit value, (ii) the secondary rotational speed Nsec is not lower than the first output-rotational-speed value and is lower than the second output-rotational-speed value and (iii) the certain control operation is being executed, the update inhibiting portion 98 inhibits the transmission shifting control portion 96 from updating the actual gear ratio γcvt of the continuously-variable transmission mechanism 24, namely, outputs an update inhibiting command for inhibiting the update of the actual gear ratio γcvt, which is supplied to the transmission shifting control portion 96.

When determining that the primary rotational speed Npri is lower than the lower limit value, the update inhibiting portion 98 inhibits the transmission shifting control portion 96 from updating the actual gear ratio γcvt of the continuously-variable transmission mechanism 24. When determining that the secondary rotational speed Nsec is lower than the first output-rotational-speed value, the update inhibiting portion 98 inhibits the transmission shifting control portion 96 from updating the actual gear ratio γcvt of the continuously-variable transmission mechanism 24. When determining that the primary rotational speed Npri is not lower than the lower limit value, and that the secondary rotational speed Nsec is not lower than the first output-rotational-speed value and is lower than the second output-rotational-speed value with the absolute value of the secondary-rotational-speed change rate dNsec/dt being not smaller than the above-described given value, the update inhibiting portion 98 inhibits the transmission shifting control portion 96 from updating the actual gear ratio γcvt of the continuously-variable transmission mechanism 24.

When determining that the primary rotational speed Npri is not lower than the lower limit value and that the secondary rotational speed Nsec is not lower than the second output-rotational-speed value, the update inhibiting portion 98 allows the transmission shifting control portion 96 to update the actual gear ratio γcvt of the continuously-variable transmission mechanism 24, namely, outputs an update allowing command for allowing the update of the actual gear ratio γcvt, which is supplied to the transmission shifting control portion 96. When determining that the primary rotational speed Npri is not lower than the lower limit value, and that the secondary rotational speed Nsec is not lower than the first output-rotational-speed value and is lower than the second output-rotational-speed value with the absolute value of the secondary-rotational-speed change rate dNsec/dt being smaller than the above-described given value, the update inhibiting portion 98 allows the transmission shifting control portion 96 to update the actual gear ratio γcvt of the continuously-variable transmission mechanism 24, if determining that the certain control operation is not being executed.

When the update inhibiting command is being outputted by the update inhibiting portion 98, the transmission shifting control portion 96 does not update the actual gear ratio γcvt. When the update allowing command is being outputted by the update inhibiting portion 98, the transmission shifting control portion 96 updates the actual gear ratio γcvt.

Hereinafter, the above-described certain control operation will be explained. In the vehicle 10 in which the second clutch C2 is disposed between the continuously-variable transmission mechanism 24 and the drive wheels 14 in the above-described drive-force transmitting path section, when the engine 12 is being operated with the drive-force transmitting apparatus 16 being placed in the neutral state, for example, the primary and secondary pulleys 60, 64 of the continuously-variable transmission mechanism 24 are rotated irrespective of whether the drive wheels 14 are rotated or not. When the first drive-force transmitting path PT1 or the second drive-force transmitting path PT2 is established, the rotation of each of pulleys 60, 64 becomes dependent on a rotational state of the drive wheels 14. In this instance, if the vehicle 10 is stopped or running at a low speed, the absolute value of the secondary-rotational-speed change rate dNsec/dt could be made not smaller than the above-described given value.

With the shift lever 84 being placed in the neutral position N, the drive-force transmitting apparatus 16 is placed in the neutral state. With the shift lever 84 being placed in the running operation position that is either the drive position D or the reverse position R, a corresponding one of the first drive-force transmitting path PT1 and the second drive-force transmitting path PT2 is established in the drive-force transmitting apparatus 16. Therefore, the certain control operation is a garage-engagement control operation that is executed in response to a garage shifting operation, which is made by placing the shift lever 84 from the neutral position N to the drive position D in the belt running mode, for example, so as to engage the second clutch C2. Further, the certain control operation is another garage-engagement control operation that is executed in response to another garage shifting operation, which is made by placing the shift lever 84 from the neutral position N to the drive position D in the gear running mode, for example, so as to engage the first clutch C1. Still further, the certain control operation is still another garage-engagement control operation that is executed in response to still another garage shifting operation, which is made by placing the shift lever 84 from the neutral position N to the reverse position R in the gear running mode, for example, so as to engage the first brake B1. That is, in the present embodiment, any one of the above-described garage shifting operations corresponds to the certain control operation.

Thus, in the present embodiment, the certain control operation is a control operation that is executed, for example, when any one of the first clutch C1, second clutch C2 and first brake B1 is in the released state, to switch only any one of the first clutch C1, second clutch C2 and first brake B1 to the engaged state, in response to a shifting operation made by an operator of the vehicle 10 to place the shift lever 84 as the shifting device into the running operation position.

The update inhibiting portion 98 determines whether the garage-engagement control operation as the certain control operation is being executed. The update inhibiting portion 98 determines that the garage-engagement control operation as the certain control operation is being executed, for example, in a period in which the hydraulic-control command signal Scbd requesting only one of the first clutch C1, second clutch C2 and first brake B1 to be engaged, is being outputted from the transmission shifting control portion 96 to the hydraulic control unit 46 or in a period in which in a period from a point of time at which the shift lever 84 is placed from the neutral position N into the running operation position (i.e., drive position D or reverse position R) to a point of time at which the output of the hydraulic-control command signal Scbd by the transmission shifting control portion 96 is terminated.

Figure 4:
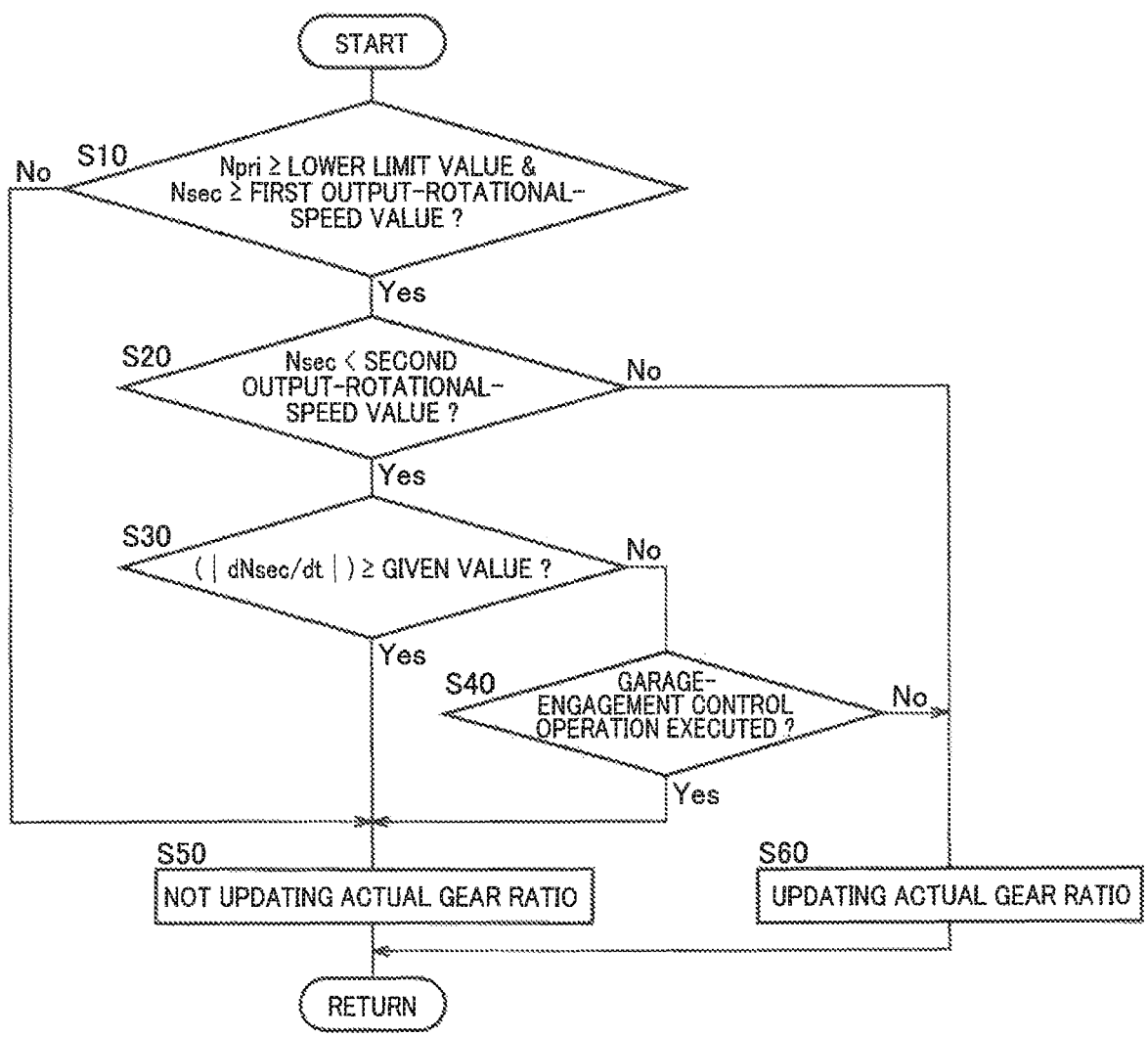
FIG. 4 is a flow chart showing a main part of a control routine executed by the control apparatus, namely, a control routine that is executed for preventing the actual gear ratio of the continuously-variable transmission mechanism from being calculated erroneously where a secondary rotational speed is used in the calculation of the actual gear ratio.
Figure 5:
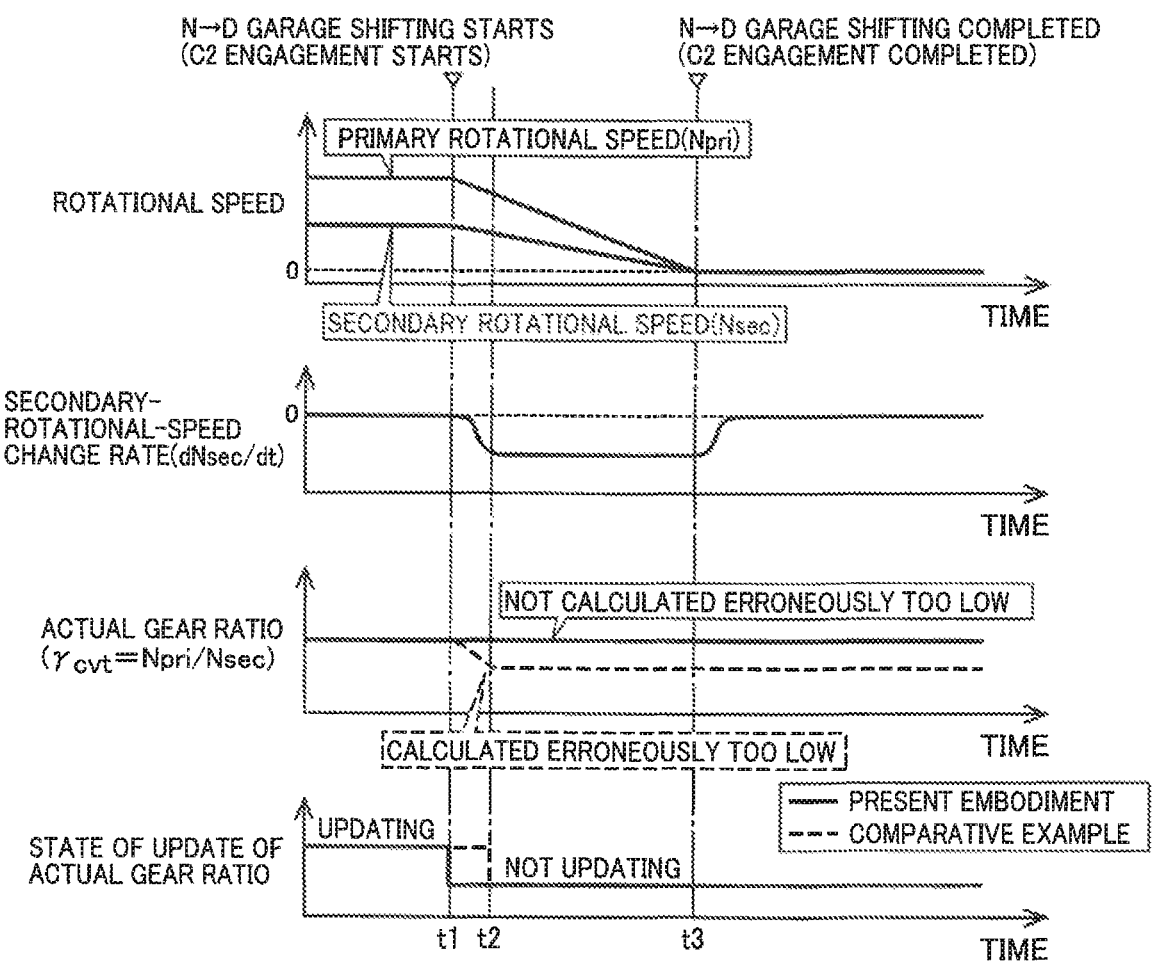
FIG. 5 is a time chart for explaining, by way of example, a case where the control routine of FIG. 4 is executed.

FIG. 4 is a flow chart showing a main part of a control routine executed by the electronic control apparatus 90, namely, a control routine that is executed for preventing the actual gear ratio γcvt of the continuously-variable transmission mechanism 24 from being calculated erroneously where the secondary rotational speed Nsec is used in the calculation of the actual gear ratio γcvt. This control routine is executed, for example, in a repeated manner. FIG. 5 is a time chart for explaining, by way of example, a case where the control routine of FIG. 4 is executed.

As shown in FIG. 4, the control routine is initiated with step S10 corresponding to function of the update inhibiting portion 98, which is implemented to determine whether the primary rotational speed Npri is equal to or higher than the lower limit value and the secondary rotational speed Nsec is equal to or higher than the first output-rotational-speed value. When an affirmative determination is made at step S10, step S20 corresponding to function of the update inhibiting portion 98 is implemented to determine whether the secondary rotational speed Nsec is lower than the second output-rotational-speed value. When an affirmative determination is made at step S20, step S30 corresponding to function of the update inhibiting portion 98 is implemented to determine whether the absolute value of the secondary-rotational-speed change rate dNsec/dt is equal to or larger than the above-described given value. When a negative determination is made at step S30, the control flow goes to step S40 corresponding to function of the update inhibiting portion 98, which is implemented to determine whether the garage-engagement control operation is being executed. When a negative determination is made at step S10, when an affirmative determination is made at step S30 and when an affirmative determination is made at step S40, the control flow goes to step S50 corresponding to functions of the update inhibiting portion 98 and the transmission shifting control portion 96, which is implemented to output the update inhibiting command and not update the actual gear ratio γcvt. When a negative determination is made at step S20 and when a negative determination is made at step S40, the control flow goes to step S60 corresponding to functions of the update inhibiting portion 98 and the transmission shifting control portion 96, which is implemented to output the update allowing command and to update the actual gear ratio γcvt.

FIG. 5 shows, by way of example, a case in which the garage shifting operation is made by placing the shift lever 84 from the neutral position N to the drive position D during stop of the vehicle 10 with the engine 12 being operated. In FIG. 5, a point t1 of time indicates a point of time at which the second clutch C2 is engaged in response to the garage shifting operation. A point t3 of time indicates a point of time at which the garage-engagement control operation is completed, namely, the second clutch C2 becomes fully engaged.

In process of engagement of the second clutch C2, the primary rotational speed Npri and the secondary rotational speed Nsec are both changed toward to zero (see a stage between the point t1 of time and the point t3 of time). Meanwhile, the secondary-rotational-speed change rate dNsec/dt subjected to the filter processing is gradually changed toward to a changed value, by taking a certain length of time (see a state between the point t1 of time and a point t2 of time). Therefore, in a comparative example represented by broken line, the update of the actual gear ratio γcvt is not inhibited until the point t2 of time, so that the actual gear ratio γcvt is erroneously calculated to a shift-up side value, namely, the actual gear ratio γcvt is calculated to a value lower than the reality. On the other hand, in the present embodiment represented by sold line, the update of the actual gear ratio γcvt is inhibited at the point t1 of time, so that the actual gear ratio γcvt is not erroneously calculated to a shift-up side value.

As described above, in the present embodiment, when the secondary rotational speed Nsec is in the low rotational speed range (in which the accuracy of calculation of the gear ratio γcvt is assured as long as the absolute value of the secondary-rotational-speed change rate dNsec/dt is smaller than the given value) and the certain control operation (which is likely to cause the absolute value of the secondary-rotational-speed change rate dNsec/dt to be not smaller than the given value) is being executed, the transmission shifting control portion 96 is inhibited from updating the actual gear ratio γcvt of the continuously-variable transmission mechanism 24. Thus, even if the absolute value of the secondary-rotational-speed change rate dNsec/dt subjected to the filter processing becomes not smaller than the given value with delay relative to an absolute value of the actual secondary-rotational-speed change rate dNsec/dt upon execution of the certain control operation, it is possible to prevent the gear ratio γcvt of the continuously-variable transmission mechanism 24 from being updated in a period in which the increase of the absolute value of the secondary-rotational-speed change rate dNsec/dt subjected to the filter processing is delayed relative to the increase of the absolute value of the actual secondary-rotational-speed change rate dNsec/dt. Therefore, it is possible to prevent the calculation of the actual gear ratio γcvt of the continuously-variable transmission mechanism 24 from being made erroneously where the secondary-rotational-speed change rate dNsec/dt subjected to the filter processing is used in the calculation of the actual gear ratio γcvt of the continuously-variable transmission mechanism 24.

In the present embodiment, the accuracy of calculation of the primary input torque Tpri that is calculated with use of the actual gear ratio γcvt is assured during execution of the certain control operation, so that it is possible to improve an accuracy of a feedforward control that is executed to calculate the target secondary thrust Wsect and the target primary thrust Wprit using the target gear ratio γcvttgt and the primary input torque Tpri and control the continuously-variable transmission mechanism 24. Thus, in execution of the feedforward control, it is possible to assure a robustness against an abrupt change of the secondary rotational speed Nsec in the low rotational speed range and also a followability of the actual gear ratio γcvt to the target gear ratio γcvttgt. It is noted that the robustness means a performance for avoiding a system from becoming unstable, for example, due to disturbance.

In the present embodiment, when the primary rotational speed Npri is not lower than the lower limit value with the secondary rotational speed Nsec being not lower than the first output-rotational-speed value and being lower than the second output-rotational-speed value, the transmission shifting control portion 96 is inhibited from updating the gear ratio γcvt of the continuously-variable transmission mechanism 24, if the certain control operation is being executed. Thus, it is possible to assure the accuracy of detection of the rotational speeds used in calculation of the actual gear ratio γcvt and to prevent the actual gear ratio γcvt from being erroneously calculated.

In the present embodiment, the transmission shifting control portion 96 is inhibited from updating the gear ratio γcvt of the continuously-variable transmission mechanism 24, (i) when the primary rotational speed Npri is lower than the lower limit value with the secondary rotational speed Nsec being lower than the first output-rotational-speed value, and (ii) when the primary rotational speed Npri is not lower than the lower limit value with the secondary rotational speed Nsec being not lower than the first output-rotational-speed value and being lower than the second output-rotational-speed value and with the absolute value of the secondary-rotational-speed change rate dNsec/dt being not smaller than the given value. Thus, the gear ratio γcvt of the continuously-variable transmission mechanism 24 is not updated when the accuracy of detection of the primary rotational speed Npri is not assured and when the accuracy of the secondary rotational speed Nsec is not assured. Further, when the absolute value of the secondary-rotational-speed change rate dNsec/dt is so large that, for example, the accuracy of calculation of the gear ratio γcvt of the continuously-variable transmission mechanism 24, the gear ratio γcvt of the continuously-variable transmission mechanism 24 is not updated, so that it is possible to avoid the actual gear ratio γcvt from being calculated erroneously due to change of the secondary rotational speed Nsec.

In the present embodiment, the transmission shifting control portion 96 is allowed to update the gear ratio γcvt of the continuously-variable transmission mechanism 24, (i) when the primary rotational speed Npri is not lower than the lower limit value with the secondary rotational speed Nsec being not lower than the second output-rotational-speed value, and (ii) when the primary rotational speed Npri is not lower than the lower limit value with the secondary rotational speed Nsec being not lower than the first output-rotational-speed value and being lower than the second output-rotational-speed value and with the absolute value of the secondary-rotational-speed change rate dNsec/dt being smaller than the given value, as long as the certain operation is not being executed. Thus, it is possible to make the calculation of the actual gear ratio γcvt with the calculation accuracy being appropriately assured.

In the present embodiment, it is possible to prevent the actual gear ratio γcvt from being erroneously calculated when the garage-engagement control operation is executed.

There will be described another embodiment of this invention. The same reference signs as used in the above-described first embodiment will be used in the following embodiment, to identify the functionally corresponding elements, and descriptions thereof are not provided.

Second Embodiment

In the above-described first embodiment, the garage-engagement control operation has been described as an example of the certain control operation that is recited as "a certain operation" in the appended claims. In the following description regarding this second embodiment, there will be described another control operation (that is other than the garage-engagement control operation) as another example of the certain control operation. In the vehicle 10 in which the second clutch C2 is disposed between the continuously-variable transmission mechanism 24 and the drive wheels 14 in the drive-force transmitting path section (that constitutes a part of the above-described second drive-force transmitting path PT2), when the drive-force transmitting apparatus 16 is placed in the neutral state, the rotation of the primary and secondary pulleys 60, 64 of the continuously-variable transmission mechanism 24 are not dependent on the rotations of the drive wheels 14. When the engine 12 is stopped, the rotations the pulleys 60, 64 are reduced toward zero. In this instance, the absolute value of the secondary-rotational-speed change rate dNsec/dt could be made not smaller than the above-described given value.

Therefore, in this second embodiment, the certain control operation is an economy-running control operation that is executed, upon deceleration of the vehicle 10 during the gear running mode with the first clutch C1 being in the engaged state, to stop the operation of the engine 12 and to switch the first clutch C1 from the engaged state to the released state. Further, the certain control operation is another economy-running control operation that is executed, upon deceleration of the vehicle 10 during the belt running mode with the second clutch C1 being in the engaged state, to stop the operation of the engine 12 and to switch the second clutch C2 from the engaged state to the released state.

Thus, in this second embodiment, the certain control operation is a control operation that is to be executed, during running of the vehicle 10 with only one of the first and second clutches C1, C2 being in the engaged state, to stop the operation of the engine 12 and to switch the one of the first and second clutches C1, C2 from the engaged state to the released state.

In this second embodiment, the update inhibiting portion 98 determines whether the economy-running control operation as the certain control operation is being executed. The update inhibiting portion 98 determines that the economy-running control operation is being executed, for example, in a period in which the engine-control command signal Se requesting the engine 12 to be temporarily stopped, is being outputted from the engine control portion 94 to the engine control device 42 and in which the hydraulic-control command signal Scbd requesting a corresponding one of the engagement devices to be switched from the engaged state to the released state, is being outputted from the transmission shifting control portion 96 to the hydraulic control unit 46.

Figure 6:
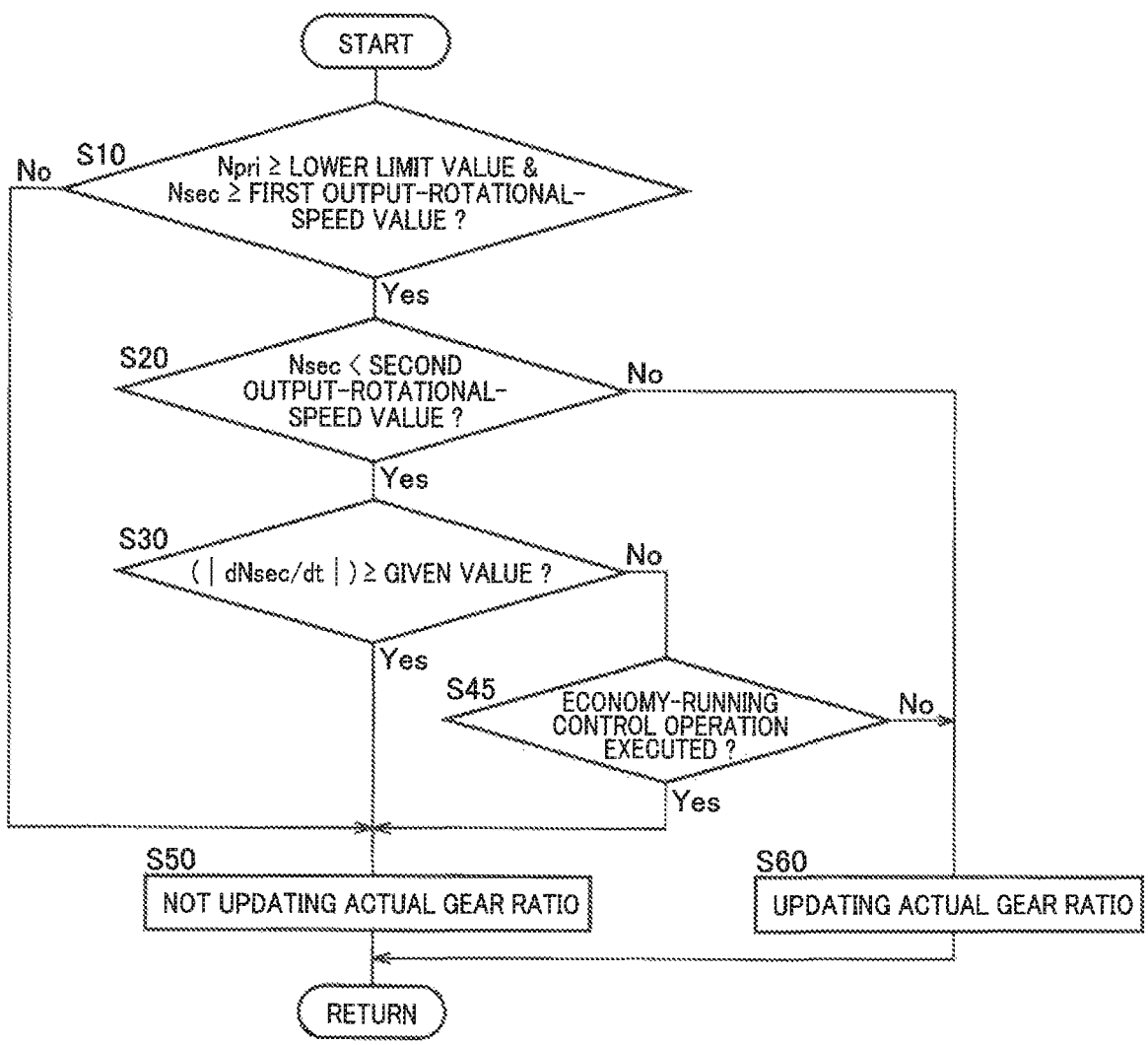
FIG. 6 is a flow chart showing a main part of a control routine executed by the control apparatus, namely, a control routine that is executed for preventing the actual gear ratio of the continuously-variable transmission mechanism from being calculated erroneously where the secondary rotational speed is used in the calculation of the actual gear ratio, wherein the control routine is according to another embodiment that is other than the embodiment shown in FIG. 4.

FIG. 6 is a flow chart showing a main part of a control routine executed by the electronic control apparatus 90, namely, a control routine that is executed for preventing the actual gear ratio γcvt of the continuously-variable transmission mechanism 24 from being calculated erroneously where the secondary rotational speed Nsec is used in the calculation of the actual gear ratio γcvt, wherein the control routine is according to this second embodiment and is other than the control routine shown in FIG. 4 according to the first embodiment. This control routine is executed, for example, in a repeated manner. This control routine of FIG. 6 is different from the control routine of FIG. 4 in that step S40 is replaced by step S45. There will be described mainly the difference of the control routine of FIG. 6 from the control routine of FIG. 4.

As shown in FIG. 6, when a negative determination is made at step S30, the control flow goes to step S45 corresponding to function of the update inhibiting portion 98, which is implemented to determine whether the economy-running control operation is being executed. When a negative determination is made at step S10, when an affirmative determination is made at step S30 and when an affirmative determination is made at step S45, the control flow goes to step S50 corresponding to functions of the update inhibiting portion 98 and the transmission shifting control portion 96, which is implemented to output the update inhibiting command and not update the actual gear ratio γcvt. When a negative determination is made at step S20 and when a negative determination is made at step S45, the control flow goes to step S60 corresponding to functions of the update inhibiting portion 98 and the transmission shifting control portion 96, which is implemented to output the update allowing command and to update the actual gear ratio γcvt.

As described above, as in the above-described first embodiment, in this second embodiment, it is possible to prevent the calculation of the actual gear ratio γcvt of the continuously-variable transmission mechanism 24 from being made erroneously where the secondary-rotational-speed change rate dNsec/dt subjected to the filter processing is used in the calculation of the actual gear ratio γcvt of the continuously-variable transmission mechanism 24. For example, it is possible to prevent the actual gear ratio γcvt from being erroneously calculated when the economy-running control operation is executed.

While the preferred embodiments of this invention have been described in detail by reference to the drawings, it is to be understood that the invention may be otherwise embodied.

In the above-described first embodiment, the control routine of FIG. 4 may be modified as needed. For example, steps S30 and $40 may be switched to each other in the control routine of FIG. 4. In the above-described second embodiment, the control routine of FIG. 6 may be modified as needed. For example, steps S30 and S45 may be switched to each other in the control routine of FIG. 4.

In the above-described first embodiment, in the example shown in the time chart of FIG. 5, the garage-engagement control operation is executed when the vehicle 10 is being stopped. However, the present invention is applicable also to a case in which the garage-engagement control operation is executed when the vehicle 10 is running. In such a case in which the vehicle 10 is running, "0 (zero)" indicated in column of "ROTATIONAL SPEED" in the time chart of FIG. 5 is converted to a value corresponding to a running speed V of the running vehicle 10.

In the above-described first and second embodiments, the certain control operation is the garage-engagement control operation or the economy-running control operation. However, the certain control operation may be also a control operation to be executed during a neutral control operation that is executed, when the vehicle 10 is being stopped or running with the engine 12 being operated, to place the drive-force transmitting apparatus 16 into the neutral state with the shift lever 84 being held in the drive position D, wherein the control operation is executed to terminate the neutral control operation and establish the first drive-force transmitting path PT1 or second drive-force transmitting path PT2. That is, the certain control operation may be a control operation that is executed to return from the neutral control operation. Thus, the certain control operation may be any control operation by execution of which the absolute value of the secondary-rotational-speed change rate dNsec/dt is likely to be increased to the given value or more.

In the above-described first and second embodiment, the present invention is applied to the vehicle 10 having the first and second drive-force transmitting paths PT1, PT2 that are provided in parallel with each other between the input shaft 22 and the output shaft 30, such that the drive force is transmittable by the gear mechanism 28 through the first drive-force transmitting path PT1, and such that the drive force is transmittable by the continuously-variable transmission mechanism 24 through the second drive-force transmitting path PT2. However, the present invention is applicable also to a drive-force transmitting apparatus having a single drive-force transmitting path provided between the drive force source and the drive wheels, wherein the drive force is transmittable through the single drive-force transmitting path by a belt-type continuously-variable transmission mechanism such as the continuously-variable transmission mechanism 24 and wherein a continuously-variable-transmission engagement device is provided in a drive-force transmitting path section (that corresponds to a section of the single drive-force transmitting path) between the belt-type continuously-variable transmission mechanism and the drive wheels. The present invention is applicable to any vehicle that has a belt-type continuously-variable transmission mechanism and a continuously-variable-transmission engagement device that are disposed in series with each other in a drive-force transmitting path section between the continuously-variable transmission mechanism and drive wheels of the vehicle, wherein the continuously-variable-transmission engagement device is located between the continuously-variable transmission mechanism the drive wheels in the drive-force transmitting path section. The continuously-variable-transmission engagement device disposed in series with the belt-type continuously-variable transmission mechanism may be a frictional engagement device such as a starting clutch, or may be a frictional engagement device like the first clutch C1 or first brake B1 that are included in the forward/reverse switching device 26.

In a control apparatus for the drive-force transmitting apparatus having the single drive-force transmitting path through which the drive force is transmittable by the belt-type continuously-variable transmission mechanism, the above-described certain control operation is a control operation that is executed in response to a shifting operation, which is made by placing the shift lever 84 into the running operation position by a vehicle operator when the continuously-variable-transmission engagement device is in its released state, so as to switch the continuously-variable-transmission engagement device to its engaged state, namely, a garage-engagement control operation that is executed in response to a garage shifting operation so as to engage the continuously-variable-transmission engagement device. In such a control apparatus, too, it is possible to prevent the actual gear ratio of the belt-type continuously-variable transmission mechanism from being erroneously calculated when the garage-engagement control operation is executed.

In the control apparatus for the drive-force transmitting apparatus having the single drive-force transmitting path through which the drive force is transmittable by the belt-type continuously-variable transmission mechanism, the above-described certain control operation is a control operation that is executed, for example, during running of the vehicle with the continuously-variable-transmission engagement device being in the engaged state, to stop operation of the engine and switch the continuously-variable-transmission engagement device from the engaged state to the released state, namely, an economy-running control operation that is executed, during decelerated running of the vehicle with the continuously-variable-transmission engagement device being engaged, to stop operation of the engine and release the continuously-variable-transmission engagement device. In such a control apparatus, too, it is possible to prevent the actual gear ratio of the belt-type continuously-variable transmission mechanism from being erroneously calculated when the economy-running control operation is operated.

In the above-described embodiments, the gear mechanism 28 is a gear mechanism which provides a single gear ratio that is higher than the highest gear ratio $\gamma max$ of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio $\gamma min$ of the continuously-variable transmission mechanism 24 and/or another gear ratio that is higher than the highest gear ratio $\gamma max$ of the continuously-variable transmission mechanism 24.

In the above-described embodiments, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount $\theta acc$.

In the above-described embodiments, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiments, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiments described above is given for illustrative purpose only, and that the present invention may be embodied with various modifications and improvements which may occur to those skilled in the art.

NOMENCLATURE OF ELEMENTS

10: vehicle
12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
64: secondary pulley
66: transmission belt (transfer element)
84: shift lever (shifting device)
90: electronic control apparatus (control apparatus)
92: filter processing portion
96: transmission shifting control portion
98: update inhibiting portion B1: first brake (first engagement device, gear engagement device)
C1: first clutch (first engagement device, gear engagement device)
C2: second clutch (second engagement device, continuously-variable-transmission engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus is configured to transmit a drive force of the drive force source toward the drive wheels, and includes (a) a continuously-variable transmission mechanism including a primary pulley, a secondary pulley and a transfer element looped over the primary and secondary pulleys, and (b) an engagement device disposed between the continuously-variable transmission mechanism and the drive wheels in a drive-force transmitting path section,
wherein said control apparatus comprises:
a filter processing portion configured to make a filter processing on a detected value of an output rotational speed of the continuously-variable transmission mechanism so as to delay change of the detected value, and configured to output, as a processed output-rotational-speed value, the detected value of the output rotational speed on which the filter processing has been made;
a transmission shifting control portion configured to calculate a gear ratio of the continuously-variable transmission mechanism, based on the processed output-rotational-speed value and a detected value of an input rotational speed of the continuously-variable transmission mechanism; and
an update inhibiting portion configured to inhibit said transmission shifting control portion from updating the gear ratio of the continuously-variable transmission mechanism, when the processed output-rotational-speed value is in a low rotational speed range that is lower than a high rotational speed range with an absolute value of a rate of change of the processed output-rotational-speed value being not smaller than a given value, and
wherein said update inhibiting portion is configured, also when the processed output-rotational-speed value is in said low rotational speed range with the absolute value of the rate of change of the processed output-rotational-speed value being smaller than the given value, to inhibit said transmission shifting control portion from updating the gear ratio of the continuously-variable transmission mechanism, if a certain operation that increases the absolute value is being executed.

2. The control apparatus according to claim 1,
wherein a lower limit of said low rotational speed range is a first output-rotational-speed value, and an upper limit of said low rotational speed range is lower than a second output-rotational-speed value that is a lower limit of said high rotational speed range, and
wherein said update inhibiting portion is configured, when the detected value of the input rotational speed is not lower than a lower limit value with the processed output-rotational-speed value being not lower than the first output-rotational-speed value and being lower than the second output-rotational-speed value, to inhibit said transmission shifting control portion from updating the gear ratio of the continuously-variable transmission mechanism, if the certain operation is being executed.

3. The control apparatus according to claim 2,
wherein said update inhibiting portion is configured, when the detected value of the input rotational speed is lower than the lower limit value with the processed output-rotational-speed value being lower than the first output-rotational-speed value, to inhibit said transmission shifting control portion from updating the gear ratio of the continuously-variable transmission mechanism, and
wherein said update inhibiting portion is configured, also when the detected value of the input rotational speed is not lower than the lower limit value with the processed output-rotational-speed value being not lower than the first output-rotational-speed value and being lower than the second output-rotational-speed value and with the absolute value of the rate of change of the processed output-rotational-speed value being not smaller than the given value, to inhibit said transmission shifting control portion from updating the gear ratio of the continuously-variable transmission mechanism.

4. The control apparatus according to claim 2,
wherein said update inhibiting portion is configured, when the detected value of the input rotational speed is not lower than the lower limit value with the processed output-rotational-speed value being not lower than the second output-rotational-speed value, to allow said transmission shifting control portion to update the gear ratio of the continuously-variable transmission mechanism, and
wherein said update inhibiting portion is configured, also when the detected value of the input rotational speed is not lower than the lower limit value with the processed output-rotational-speed value being not lower than the first output-rotational-speed value and being lower than the second output-rotational-speed value and with the absolute value of the rate of change of the processed output-rotational-speed value being smaller than the given value, to allow said transmission shifting control portion to update the gear ratio of the continuously-variable transmission mechanism, if the certain operation is not being executed.

5. The control apparatus according to claim 1, wherein the certain operation is a control operation that is to be executed, when the engagement device is in a released state, to switch the engagement device from the released state to an engaged state, in response to a shifting operation made by an operator of the vehicle to place a shifting device into a running operation position.

6. The control apparatus according to claim 1,
wherein the drive force source is an engine, and
wherein the certain operation is a control operation that is to be executed, during running of the vehicle with the engagement device being in an engaged state, to stop an operation of the engine and to switch the engagement device from the engaged state to a released state.

7. The control apparatus according to claim 1,
wherein the drive-force transmitting apparatus further includes: an input rotary member to which the drive force is to be transmitted from the drive force source; an output rotary member from which the drive force is to be outputted to the drive wheels; a gear mechanism configured to provide at least one gear ratio; and a first engagement device that is provided in addition to the engagement device as a second engagement device, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path, such that the drive force is transmitted by the gear mechanism through the first drive-force transmitting path when the first drive-force transmitting path is established by engagement of the first engagement device, and wherein the plurality of drive-force transmitting paths include a second drive-force transmitting path that includes a section corresponding to the drive-force transmitting path section, such that the drive force is transmitted by the continuously-variable transmission mechanism through the second drive-force transmitting path when the second drive-force transmitting path is established by engagement of the second engagement device.

8. The control apparatus according to claim 7, wherein the certain operation is a control operation that is to be executed, when each of the first and second engagement devices are in a released state, to switch only one of the first and second engagement devices from the released state to an engaged state, in response to a shifting operation made by an operator of the vehicle to place a shifting device into a running operation position.

9. The control apparatus according to claim 7, wherein the drive force source is an engine, and wherein the certain operation is a control operation that is to be executed, during running of the vehicle with only one of the first and second engagement devices being in an engaged state, to stop an operation of the engine and to switch said one of the first and second engagement devices from the engaged state to a released state.

* * * * *